(12) United States Patent
Newman et al.

(10) Patent No.: US 10,468,026 B1
(45) Date of Patent: Nov. 5, 2019

(54) DYNAMIC PROTECTION OF PERSONAL INFORMATION IN AUDIO RECORDINGS

(71) Applicant: Century Interactive Company, LLC, Dallas, TX (US)

(72) Inventors: Zachary Ward Newman, Nashville, TN (US); Reid Samuel Wakefield, Dallas, TX (US); Mitchell John Brunelli, Dallas, TX (US)

(73) Assignee: Century Interactive Company, LLC, Dallas, TX (US)

( * ) Notice: Subject to any disclaimer, the term of this patent is extended or adjusted under 35 U.S.C. 154(b) by 0 days.

(21) Appl. No.: 16/104,702

(22) Filed: Aug. 17, 2018

(51) Int. Cl.
*G10L 15/00* (2013.01)
*G10L 15/04* (2013.01)
*G10L 21/00* (2013.01)
*G10L 15/22* (2006.01)
*H04M 3/42* (2006.01)
*G10L 15/08* (2006.01)

(52) U.S. Cl.
CPC .............. *G10L 15/22* (2013.01); *G10L 15/04* (2013.01); *G10L 15/08* (2013.01); *H04M 3/42221* (2013.01); *G10L 2015/088* (2013.01); *G10L 2015/223* (2013.01); *H04M 2203/301* (2013.01); *H04M 2203/303* (2013.01); *H04M 2203/6009* (2013.01)

(58) Field of Classification Search
CPC ............. H04M 3/42221; H04M 3/385; H04M 3/2281; H04M 3/2218; H04M 3/382; H04M 2203/6009; H04M 3/5175; H04M 2201/40; H04M 3/4211; H04M 3/5183; H04M 2203/6027; H04M 3/527; H04M 2203/2061; H04M 3/42042; H04M 7/0078; G10L 2015/088; G10L 15/26; G10L 17/14; G10L 15/1822; G10L 25/48; G10L 17/00; G10L 2015/086; G10L 15/265; H04L 63/20; H04L 2463/102; H04L 29/0685; H04L 29/06986; H04L 63/105; G06F 21/31; G06F 21/575; G06F 21/6254; G06F 21/62; G06F 2221/032; G06F 21/6245; G06K 19/10; G16H 10/60
See application file for complete search history.

(56) References Cited

U.S. PATENT DOCUMENTS 5,125,022 A * 6/1992 Hunt .................. G07C 9/00158
  379/189
5,825,871 A * 10/1998 Mark .................. G06Q 20/341
  379/357.03

(Continued)

*Primary Examiner* — Michael Ortiz-Sanchez
(74) *Attorney, Agent, or Firm* — Henry Patent Law Firm PLLC (57) ABSTRACT

In a general aspect, audio recordings are managed to protect personal identifiable information (PII) and or sensitive personal information (SPI). In an aspect, a first audio file associated with a voice call and a second audio file associated with the voice call are obtained. The first audio file is partitioned into one or more segments. Which of the one or more segments of the first audio file the number of spoken digits exceeds a certain number are identified. The second audio file is partitioned into segments corresponding in time to the identified segments of the first audio file. The voice call is tagged as containing PII or SPI in response to determining that trigger words are spoken in at least one of the segments of the second audio file.

23 Claims, 6 Drawing Sheets

(56) References Cited

U.S. PATENT DOCUMENTS

| | | | |
|---|---|---|---|
| 5,848,130 A * | 12/1998 | Rochkind | G10L 21/04 379/88.01 |
| 7,502,741 B2 | 3/2009 | Finke | |
| 9,038,177 B1 | 5/2015 | Tierney | |
| 9,111,239 B2 | 8/2015 | Minert | |
| 9,544,438 B1 * | 1/2017 | Andraszek | H04M 3/568 |
| 9,641,676 B1 * | 5/2017 | Mandic | H04M 3/42221 |
| 9,686,242 B2 * | 6/2017 | Shrivastava | H04W 4/029 |
| 9,787,835 B1 * | 10/2017 | Pycko | H04M 3/5166 |
| 9,942,392 B1 * | 4/2018 | Ouimette | H04M 3/5166 |
| 10,002,639 B1 * | 6/2018 | Gaeta | G11B 27/031 |
| 10,108,306 B2 | 10/2018 | Khoo et al. | |
| 2003/0081738 A1 * | 5/2003 | Kohnle | H04M 1/6505 379/67.1 |
| 2006/0089857 A1 | 4/2006 | Zimmerman | |
| 2007/0016419 A1 | 1/2007 | Lee | |
| 2007/0081428 A1 | 4/2007 | Malhotra | |
| 2007/0225981 A1 | 9/2007 | Kim | |
| 2008/0221882 A1 | 9/2008 | Bundock | |
| 2009/0307779 A1 | 12/2009 | Doren | |
| 2010/0027767 A1 * | 2/2010 | Gilbert | H04M 3/42221 379/88.03 |
| 2010/0082342 A1 * | 4/2010 | Erhart | G10L 21/045 704/246 |
| 2011/0286584 A1 * | 11/2011 | Angel | H04M 3/42221 379/88.02 |
| 2013/0253933 A1 * | 9/2013 | Maruta | G10L 15/00 704/246 |
| 2013/0266127 A1 * | 10/2013 | Schachter | G10L 25/48 379/88.01 |
| 2014/0128039 A1 * | 5/2014 | Maybach | H04M 3/53333 455/413 |
| 2015/0100302 A1 * | 4/2015 | Flaks | G10L 15/1822 704/9 |
| 2015/0117439 A1 * | 4/2015 | Efrati | H04L 65/1079 370/352 |
| 2015/0195406 A1 * | 7/2015 | Dwyer | H04M 3/5175 379/265.07 |
| 2019/0245974 A1 * | 8/2019 | Dwyer | H04M 3/5175 |

* cited by examiner

DYNAMIC PROTECTION OF PERSONAL INFORMATION IN AUDIO RECORDINGS

BACKGROUND

The following description relates to dynamic protection of customer personal information in audio recordings.

Organizations and businesses sometimes collect personal identifiable information (PII) and/or sensitive personal information (SPI) while conducting transactions or other business with a customer over an audio call. These audio calls are often recorded as a matter of established business practices. The recordings may be used later for training purposes or other business operational reasons. Audio recordings may be susceptible to a breach, as any other stored PII or SPI.

DETAILED DESCRIPTION

In some aspects of what is described here, personal identifiable information (PII) and/or sensitive personal information (SPI) is dynamically identified and removed from audio recordings. In some cases, a customer may originate an audio call to or receive an audio call from an agent, e.g. a sales associate or customer service representative, associated with a business organization. The business organization may initiate recording of the phone call for various purposes. During the phone call, the customer may provide PII and/or SPI to the agent. For example, a customer may apply for a loan or credit card over the phone and verbally provide their social security number, credit card number, etc. to a sales agent. At termination of the phone call, the audio recording of the voice call is stored. In some cases, the audio recording may used by the business organization for training or operational purposes. For instance, in a training scenario, a supervisor may review recordings to assess performance of agents and to provide feedback to the agents on interacting with the customer and closing the sale of a product.

Due to the number and extent of breaches involving exposure of PII and SPI, governmental rules and regulations require businesses to implement policies to protect customer information, such as PII and SPI, or otherwise be subject to heavy fines in the event of a breach. Because of the large volume of calls handled by some businesses, it is not feasible for one person, or even several persons, to listen to each audio recording to determine if it contains PII or SPI. Further, giving one or more persons access to the recordings to monitor for PII or SPI may actually create an opportunity for a breach to occur. In some cases, a computer-implemented system can automatically scrub audio files of any PII or SPI quickly and dynamically without exposing the information the to any person.

In an aspect described herein, when an audio recording of a voice call is available, the recording is automatically analyzed to determine if it contains any PII or SPI of a customer. Such techniques can be used, for example, to address the technical challenge of managing large volumes of data, where each data element may or may not contain PII or SPI. For instance, computer systems can set more accurate or granular data permissions so that appropriate users can access data while others are denied access; and/or the computer systems may edit data more precisely to allow access to useful non-sensitive data without exposing PII or SPI. For instance, if PII or SPI is identified, the recording for the voice call can be flagged and access to the recording can be further restricted. In some cases, a modified recording in which the PII or SPI has been deleted may be available to a supervisor or other manager for training agents or improving other business operations.

In some cases, this aspect provides the advantage of automatically detecting and flagging customer PII or SII in audio recordings as soon as an audio recording is available to restrict access to the customer's information. This aspect also provides an advantage to the business organization of efficiently and quickly detecting recorded customer PII and SPI data as soon as available and restricting access to recordings to avoid a security breach and corresponding penalties and fines to the business.

In a general aspect, audio recordings are managed to protect personal identifiable information (PII) or sensitive personal information (SPI). A first audio file associated with an first channel of a voice call may be obtained. A second audio file associated with a second channel of the voice call may be obtained. In some cases, whether a certain number of spoken digits are detected in a first portion of the first audio file is determined. Also, whether one or more trigger words are spoken in a portion of the second audio file corresponding in time to the first portion of the first audio file is determined. In some cases, the voice call is flagged as containing PII or SPI in response to determining one or more trigger words are spoken in the portion of the second audio file corresponding in time to the first portion of the first audio file. In some cases, access is restricted to the first and second audio files associated with the flagged voice call.

Figure 1:
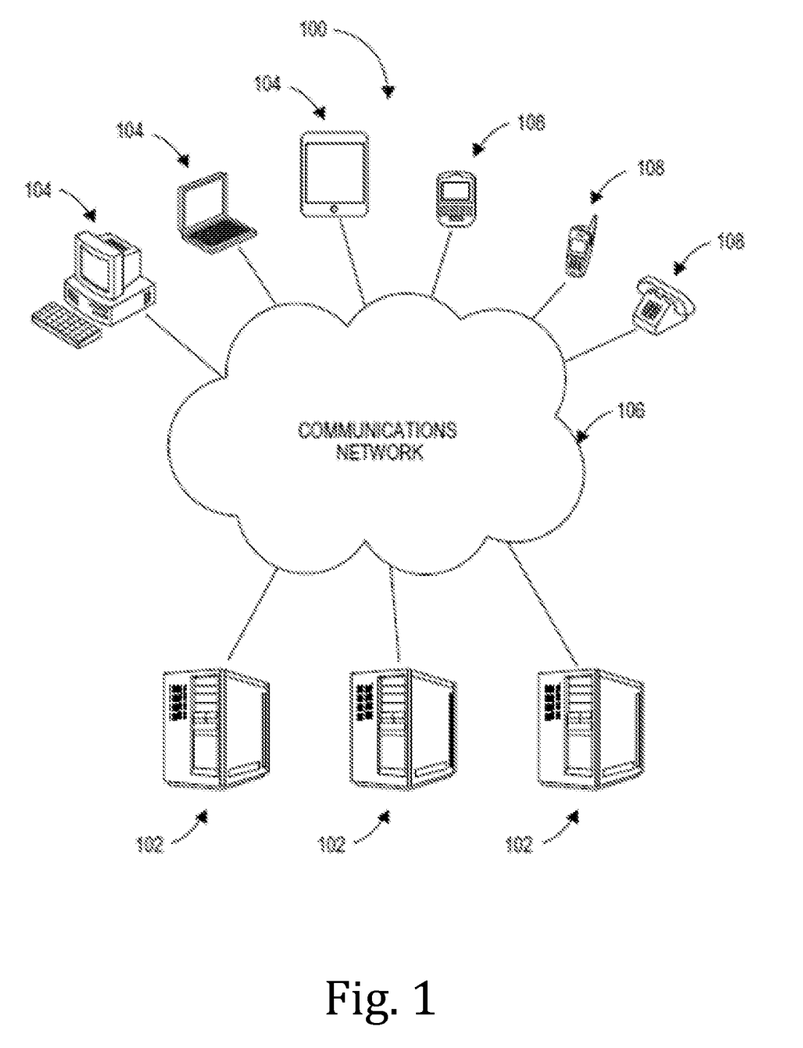
FIG. 1 is a diagram showing aspects of an example communication system.

FIG. 1 is a diagram showing aspects of an example communication system. The communication system may include server devices 102, computing devices 104, a communications network 106, and one or more voice communication devices 108. In some cases, the server devices 102 include computing devices that provide access to one or more general computing resources, such as Internet services, electronic mail services, data transfer services, and the like. In some cases, the server devices 102 include or provide access to a database that stores information. For instance, the database may store a client's audio recordings which may be the subject of analysis for identifying PII and/or SPI. In this case, the client is a business or other organization that may create audio recordings of phone calls between the client's agent and a customer.

Communication devices 104 may include mobile communication devices (including wireless devices), work stations, desktop computers, laptop computers, palmtop computers, tablet computers, portable digital assistants (PDA), smart phones, and the like, or combinations thereof. In some cases, computing devices facilitate interaction and communication through a graphical user interface (GUI) that is displayed via an electronic display of the computing device 104.

The communications network 106 comprises wired or wireless networks and, in some embodiments, includes servers, routers, switches, wireless receivers and transmitters, and the like, as well as electrically conductive cables or optical cables. The communications network 106 also includes, in some embodiments, local, metro, or wide area networks, as well as the Internet, or other cloud networks. Furthermore, in some embodiments, the communications network 106 includes cellular or mobile phone networks, as well as landline phone networks, public switched telephone networks, fiber optic networks, or the like.

Figure 2A:
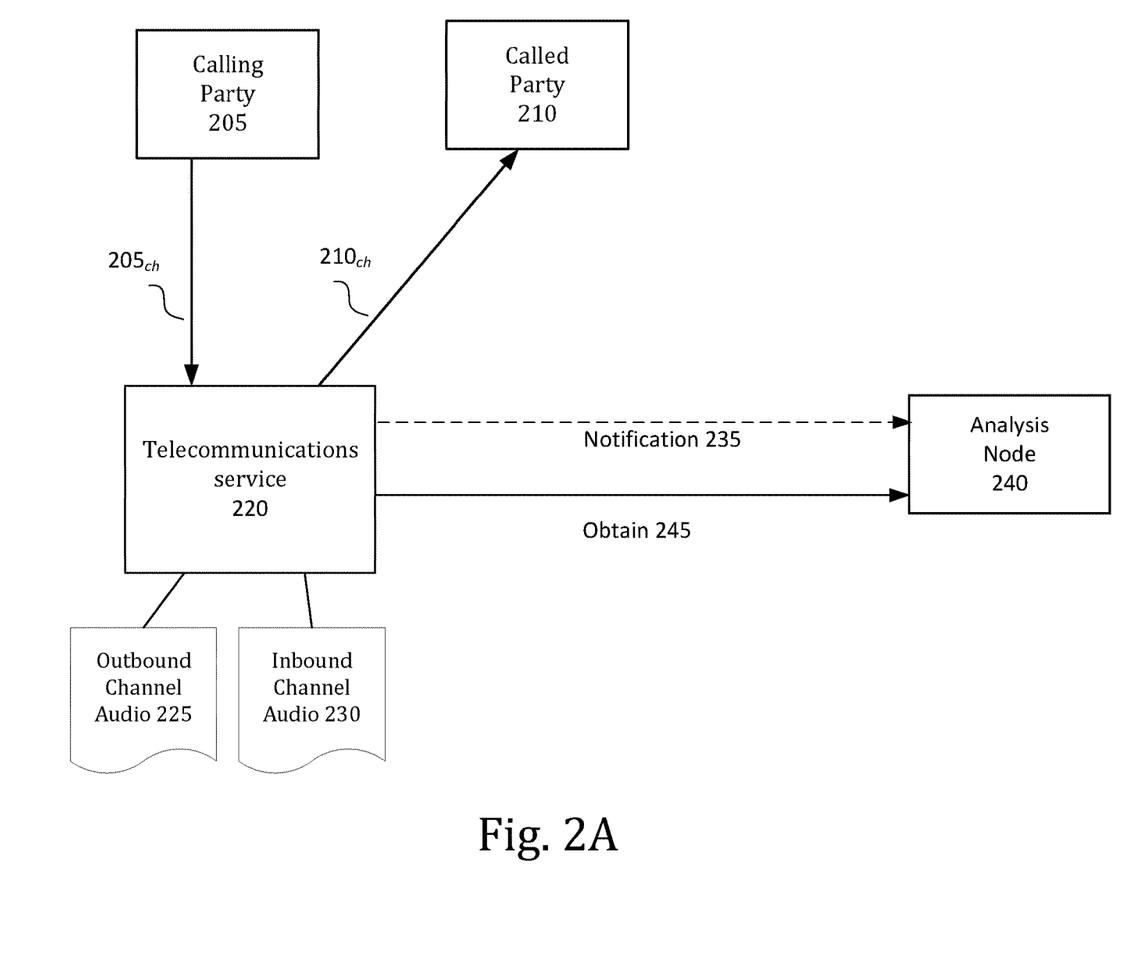
FIGS. 2A-2B are block diagrams showing an example of creating and processing audio files.
Figure 2B:
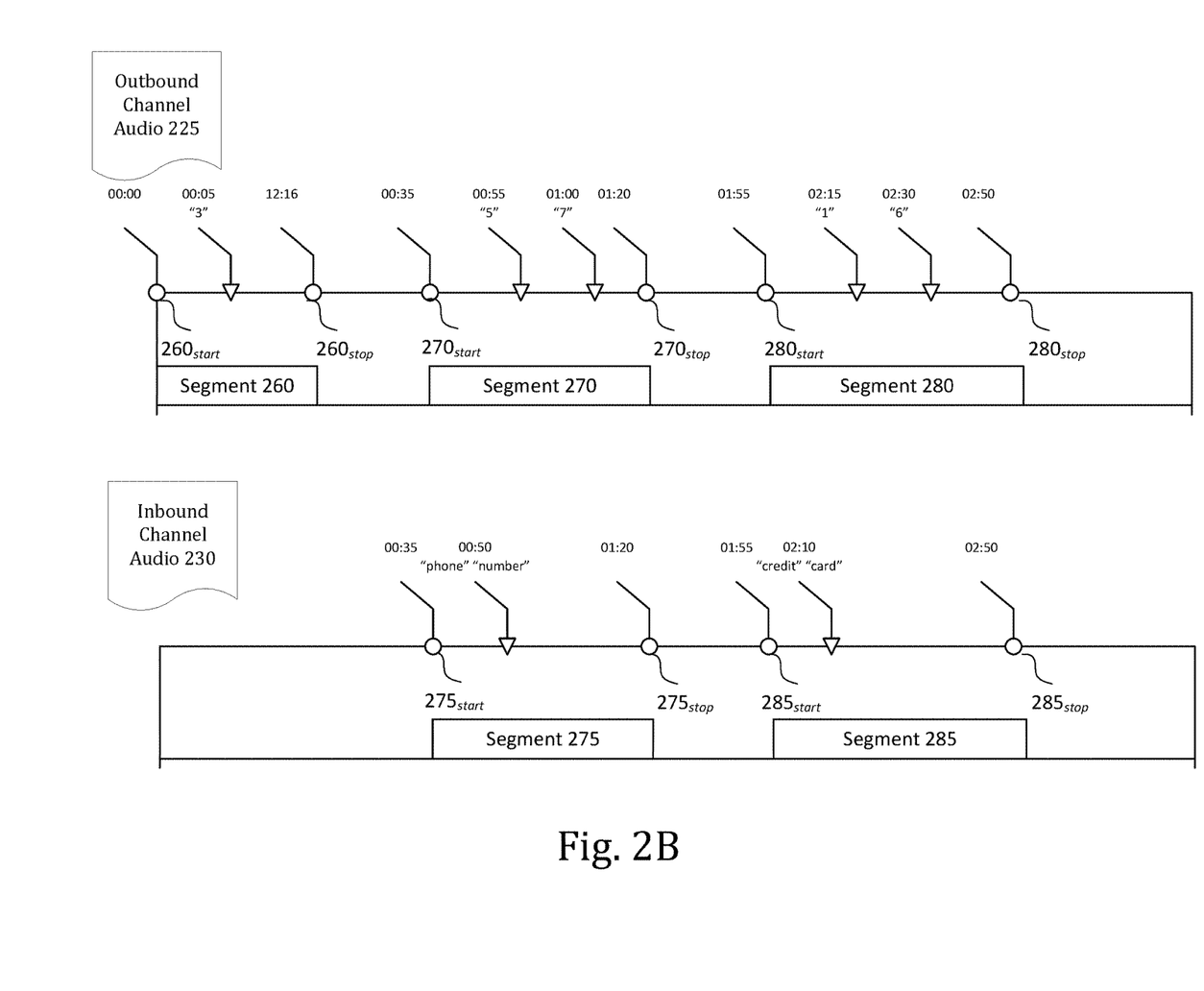

The voice communications device 108 includes any type of voice communication apparatus capable of transmitting voice information and/or data. For instance, communication devices 108 may include mobile phones, cell phones, smartphones, landline phones, or the like. In certain embodiments, communication devices 104 may be a type of voice communications device 108, or may be a device configured with an application that provides support for voice communications FIGS. 2A-2B are block diagrams showing an example of creating and processing audio files. In FIG. 2A, for example, a calling party 205, e.g. a customer, may originate a call, e.g. on a voice communications device 108, to a called party 210, e.g. a business, by dialing a destination number of a telecommunications service 220, e.g. an 800 number or other digits for routing associated with the business. This part of the call, e.g. the originating side, may be referred to as the outbound side of the call $205_{ch}$. In some cases, the telecommunications service 220 may be provided by a network device, e.g. server device 102, via communications network 106. The telecommunications service 220 may interpret the incoming call, e.g. as a service request, and route the call to the destination via the communications network 106. In some cases, the call may be routed via the communications network 106 to the called party 210, e.g. computing device 104, associated with a call agent of the business. This part of the call may be referred to as the inbound side of the call $210_{ch}$. In some implementations, a call agent for the business may initiate a call to a customer on behalf of the business, for example, in response to receiving a message from the customer requesting a callback. In that instance, the customer may receive a call originating from the client agent, in which case the call agent side would be the outbound side of the call, e.g. calling party 205, and the customer side would be the inbound side of the call, e.g. called party 210.

For each voice call, the telecommunications service 220 may make an audio recording 225 of the outbound channel of the call $205_{ch}$, and a corresponding second audio recording 230 may be made for the incoming channel of the call $210_{ch}$. In one aspect, both the outbound audio recording $205_{ch}$ and the second recording $210_{ch}$ are analyzed in coordination to determine whether PII or SPI of a customer was recorded. While PII and SPI may denote different types of customer information, these different types of information are treated equally such that it is unimportant to classify information in the recording as either PII or SPI. The telecommunications service 220 may make two recordings 225, 230, one for each of the outbound channel $205_{ch}$ and inbound channel $210_{ch}$ for redundancy and also because the quality of service of the call may differ between the two channels used by the telecommunications service 220 in establishing the call. In some implementations, the audio recordings 225, 230 are stored in the form of an audio file, e.g. an .mp3 file. The audio recordings 225, 230 may be stored in memory on the telecommunications service 220, on a different network device, e.g. another server device 102 (not shown), or in the cloud (not shown).

An analysis node 240 may obtain 245 the outbound channel audio recording 225 and the inbound channel audio recording 230 from storage, e.g. at telecommunications service 220, in order to determine if protected information, e.g. PII or SPI of a customer, was exchanged during the voice call. The audio recordings 225, 230 may be obtained by a request/response or may be provided automatically by telecommunication service 220. In some implementations, a copy of audio recordings 225, 230 are obtained for processing by the analysis node 240. The analysis node 240 may be, e.g. a server node 102 in the network or cloud, or may be a communications device 104 which may be located in the network or at the premises of a business subscribing to the telecommunications service. The audio recordings 225, 230 should be analyzed as quickly as possibly to avoid any potential breach of the protected data. In some cases, the analysis node may receive a notification 235 that a new voice call has been recorded. In some instances, analysis node 240 may obtain audio recordings 225, 230 in response to the notification 235. Because the call volume for a business may be quite large, the notification 235 facilitates the processing of the recording without delay. In some implementations, the analysis node may periodically run an audit of the voice calls recorded by the telecommunications service to identify new voice calls that have not been processed.

FIG. 2B illustrates an example of analyzing a voice call recorded in FIG. 2A. In the example shown in FIG. 2B, the analysis node 240 may start by analyzing the outbound channel audio recording 225. In other instances, the analysis node 240 may process the audio recordings starting with the inbound channel audio recording 230. Depending on which party originated the call, the outbound channel audio recording 225 may be from the customer or the call agent side. The analysis node 240 processes audio recording 225 to detect spoken digits. For example, in some implementations, an audio recording may be converted from an .mp3 file to a .wav file and sampled, e.g. at 8 khz corresponding to speech. In some cases, the scrubbed .wav file may be processed to convert the audio to phonemes (e.g. one="W AH N", two="T UW", three—"TH R IY", etc.), which produces output that may be used to identify spoken digits. The results may be filtered to generate output identifying spoken digits and a timestamp for each of the identified spoken digits in the file.

In an example, a call may be originated from a customer to a sales agent at a car dealership. In this case, the customer side of the voice exchange may include the following spoken words or phrases, e.g. at time 0:05 "I'm interested in 3 cars", at time 0:55 "5551234567", at time 2:15 "1234567890123456". In some cases, each of the spoken digits are identified and timestamped in the file. For simplicity, only the timestamp for select digits are illustrated in FIG. 2B.

In FIG. 2B, the analysis node 240 partitions the audio file into segments based on the identified spoken digits and corresponding timestamps. For example, the analysis node 240 detects the spoken digit "3" at timepoint 0:05 of audio recording 225 and creates a segment and determines a start time and stop time of the segment 260 corresponding to the timepoint. In some cases, the analysis node 240 may set a start time prior to the timepoint of digit detection, e.g. 20 seconds prior, to include the time in which spoken words or phrases associated with the spoken digits may occur. If the audio file does not have at least that amount of preceding audio, then the start time may be set at the beginning of the file, e.g. start time $260_{start}$. The stop time may be set to a time subsequent to the timepoint of the first digit. For example, the analysis node 240 may perform analysis to detect subsequent digits within a certain period of time, e.g. 20 seconds, after spoken digit "3" at timepoint 0:05. In an example, the analysis node may check for subsequent digits for 20 seconds, e.g. until 0:25. If no subsequent digits are spoken, then the stop time is set at 0:25 of the audio file, e.g. stop time $260_{stop}$. If a subsequent spoken digit is detected, the analysis node checks for a next subsequent digit for another certain period of time, e.g. 20 seconds, until no subsequent digits are detected within the certain period of time. In this example, the next spoken digit "5" is detected at timepoint 0:55, and a second segment 270 is partitioned based on that timepoint. In this case, the start time $270_{start}$ may be set to a prior time, e.g. 20 seconds prior at 0:35. The stop time is determined based on how many subsequent digits are detected. In this case, analysis node will detect subsequent digits "551234567", where digit "7" is time-stamped at 1:00. In this case, each of the digits were spoken within 20 seconds of the previous digit, but no subsequent spoken digits are detected for the certain period of time after that, e.g. 20 seconds later at 1:20. Therefore, the stop time $270_{stop}$ is set at 1:20. A third segment 280 is partitioned based on the spoken digit "1" at timepoint 2:15. The start time $280_{start}$ is set 20 seconds prior in the audio recording at 1:55. In this case, if the last digit "6" is detected at 2:30, and no subsequent digits are detected for a certain period of time after, the stop time $280_{stop}$ is set at 2:50. An audio recording may have any number of segments depending on the content of the voice call.

A segment of interest is a portion of the file which has a likelihood of containing PII or SPI. Analysis node 240 analyzes each segment 260, 270, 280 to determine if it is a segment of interest. In some implementations, the analysis node 240 determines a segment is of interest when it contains more than a certain number of spoken digits. In some implementations, the analysis node 240 examines the segments and disregards any segment not containing more than a certain number of digits, e.g. 4 digits. Generally, PII or SPI contains more than 4 digits, e.g. social security number, credit card number, etc. In the example of FIG. 2, the first segment 260 contains one spoken digit, e.g. "3" so it is discarded, but the other two segments 270, 280 are of interest since they contain more than 4 digits.

The spoken digits alone, however, are not indicative of PII or SPI without additional context. In some implementations, the analysis node 240 analyzes the second audio file to identify trigger words which may indicate the spoken digits are PII or SPI. In some cases, the analysis node 240 partitions the audio file 230 into segments 275, 285 corresponding to the start time and stop time of the segments 270, 280 of interest of the audio file 225, and analyzes each segment for trigger words. Trigger words indicate the type of information requested of or provided by the customer, e.g. "social security number", "credit card number", etc. For segment 270 having spoken digits "5551234567", the analysis node 240 does not detect any trigger words in the corresponding segment 275. In this example, "5551234567" may be a phone number which is not PII or SPI. For the segment 280 having spoken digits "1234567890123456", analysis node 240 detects trigger words "credit card" or some other variation of trigger words, and determines that this segment contains PII or SPI of the customer. Analysis node 240 tags the voice call as containing PII or SPI.

After flagging the voice call, analysis node 240 may restrict access to the voice call. For example, if someone at the business or perhaps a bad actor, attempts to access the audio files associated with the voice call, the request will be rejected. In some cases, the analysis node 240 may store a copy of the files with the segments deleted in which PII or SPI was detected. The analysis node may restrict access to the audio files in which PII or SPI is removed to personnel approved for access to the files, for example, supervisors or other management personnel for training or business operational purposes.

In some cases, analysis node 240 may repeat the analysis starting with audio recording 230. For example, the inbound channel audio recording 230 may be analyzed for spoken digits and the outbound channel audio recording 225 may be analyzed for trigger words. In this manner, the analysis node 240 may process files without knowing which recording is of the customer side or the call agent side, e.g. who is providing the PII or SPI and who is requesting and collecting the PII or SPI. This also provides improved accuracy, e.g. in case the quality of one side of the call is poor which affects detection of either spoken digits or trigger words in the recording, or when the customer is not speaking clearly or is difficult to understand. In some cases, for example, a call agent may repeat the PII or SPI back to the customer for confirmation and the numbers repeated by the call agent are the spoken digits that are detected in the reverse process.

Figure 3:
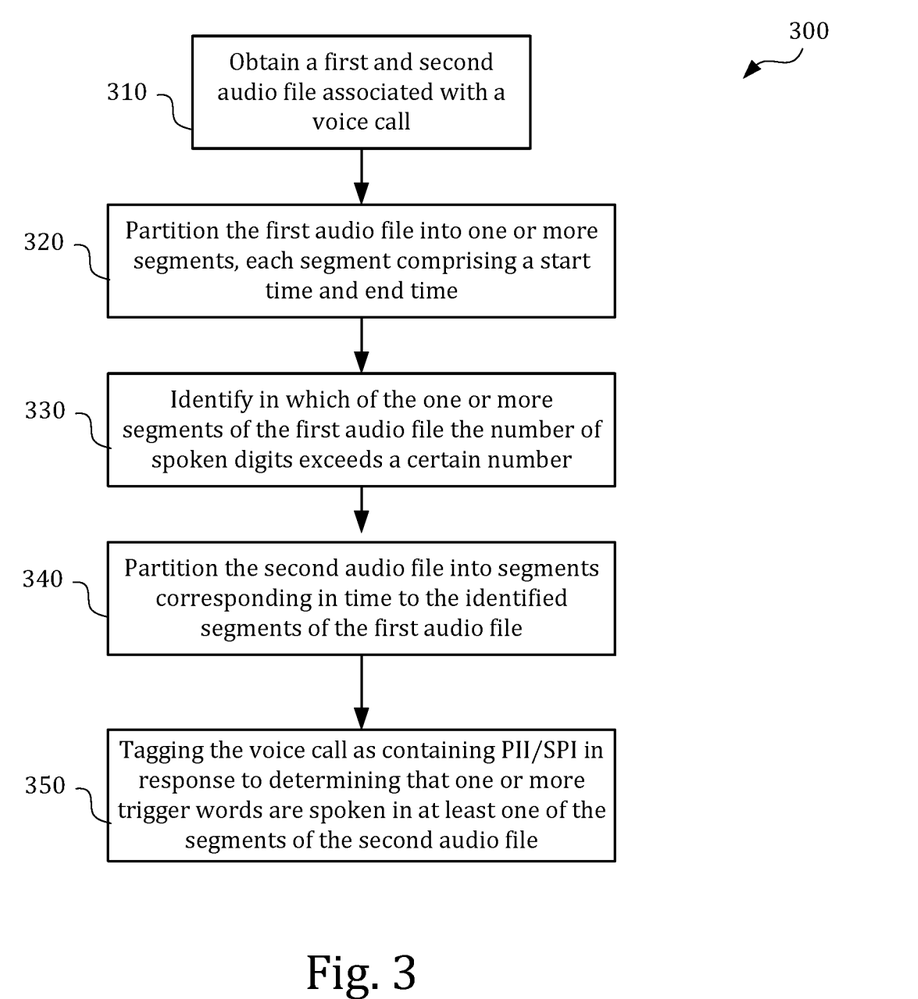
FIG. 3 is a flow diagram showing an example process for identifying PII or SPI in a voice call.

FIG. 3 is a flow diagram showing an example process 300 for identifying PII or SPI in a voice call. The process may be performed by analysis node 240 of FIG. 2. Operations of process 300 may be performed by one or more processors of a device, e.g. analysis node 240 of FIG. 2A-2B, coupled to a communications network 106. For example, operations in the example process 300 may be performed by the example analysis node 240 in FIG. 2, which may be included in an example server 102 or communications device 104 in FIG. 1 configured to analyze audio recording associated with a voice call to detect PII or SPI. The process 300 may include additional or different operations, and the operations may be performed in the order shown or in another order. In some cases, one or more of the operations shown in FIG. 3 are implemented as processes that include multiple operations, sub-processes or other types of routines. In some cases, operations can be combined, performed in another order, performed in parallel, iterated, or otherwise repeated or performed another manner.

At 310, a first audio file and a second audio file associated with a voice call are obtained. The first and second audio files may be obtained from a remote server, e.g. telecommunications service 220. The first audio file may be a recording of the outbound channel of the voice call 225, and the second audio file may be a recording of the inbound channel of the voice call 230, as described in FIGS. 2A and 2B. In other instances, the first audio file may be a recording of the inbound channel of the voice call 230, and the second audio file may be a recording of the outbound channel of the voice call 225. In some cases, the first and second audio files are obtained in response to receiving a notification that a new voice call is available for analysis to determine if PII or SPI has been recorded, as described at 235 in FIG. 2.

At 320, the first audio file is partitioned into one or more segments, e.g. 260, 270, 280 as described in FIG. 2B. Each of the segments has a start time and an end time, e.g. $260_{start}$ and $260_{stop}$, etc. A segment of the audio file may be determined based on a spoken digit detected at a timepoint in the first audio file. A start time for the segment is determined based on the timepoint in which the spoken digit is detected. The start time may be a number of seconds prior to the timepoint e.g. $260_{start}$. In other cases, to determine the stop time, whether a subsequent spoken digit occurred within a certain amount of time of a previous spoken digit is determined. The stop time is set as the time that the certain amount of time between subsequent digits is exceeded, e.g. a next subsequent digit is not detected within the certain amount of time, e.g. $260_{stop}$. The certain amount of time between subsequent digits may be the same as the number of seconds for determining the start time. In some instances, the number of seconds may be 20 seconds for determining the start time and the stop time.

At 330, which of the one of more of the segments of the first audio file that the number of spoken digits exceeds a certain number is identified. In some cases, the certain number of spoken digits exceeded is 4. For example, segments of the first audio file that have more than 4 spoken digits are identified, e.g. segments of interest 270, 280 as described in FIG. 2B.

At 340, segments of the second audio file corresponding in time to the identified segments of the first audio file are partitioned, e.g. segments 275, 285 described in FIG. 2B. At 350, the voice call is tagged as containing PII or SPI in response to determining that one or more trigger words are spoken in at least one of the segments of the second audio file. In some cases, access is restricted to the first and second audio files associated with the tagged voice call. In some instances, access is restricted by rejecting request to obtain the first or second audio file associated with the voice call from the server. In other instances, access is restricted by limiting access to first or second audio files in which PII or SPI is deleted.

Figure 4:
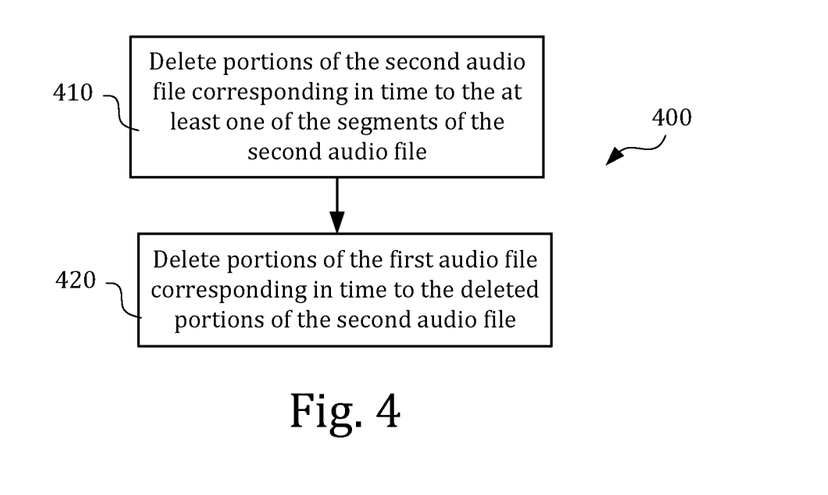
FIG. 4 is a flow diagram showing example process for deleting PII or SPI from an audio call.

FIG. 4 is a flow diagram showing example process 400 for deleting PII or SPI from an audio recordings associated with a voice call. In some cases, after a voice call has been tagged, the first and second audio files associated with the tagged calls may be acted on, e.g. edited, to remove the PII or SPI from the audio files, e.g. 225 and 230 in FIG. 2B. Operations of process 400 may be performed by one or more processors of a device, e.g. analysis node 240 of FIGS. 2A-2B, coupled to a communications network 106. For example, operations in the example process 400 may be performed by the example analysis node 240 in FIG. 2, which may be included in an example server 102 or communications device 104 in FIG. 1 configured to analyze audio recording associated with a voice call to detect PII or SPI. The process 400 may include additional or different operations, and the operations may be performed in the order shown or in another order. In some cases, one or more of the operations shown in FIG. 4 are implemented as processes that include multiple operations, sub-processes or other types of routines. In some cases, operations can be combined, performed in another order, performed in parallel, iterated, or otherwise repeated or performed another manner.

In an aspect, at 410, one or more portions of the second audio file corresponding in time to the at least one of the segments of the second audio file in which trigger words are spoken, are deleted. At 420, one or more portions of the first audio file corresponding to the deleted portions of the second audio file, are deleted. The one or more portions of the first and second audio files, e.g. segment 280, 285 described in FIG. 2B, may be deleted by, e.g. clipping those portions of the file, removing the audio portion of the file, or replacing the one or more portions with other data, e.g. blank data or white noise. The portions deleted are the segments in which the certain number of spoken digits is exceeded in the first audio file and trigger words are spoken in the segment of the second audio file corresponding in time, e.g. segment 280 of audio file 225 and segment 285 of audio file 230 having PII and SPI as described in FIG. 2B. The modified first and second audio files may be stored at the analysis node 240 or may be stored with the original audio recordings, as described in FIG. 2A.

Figure 5:
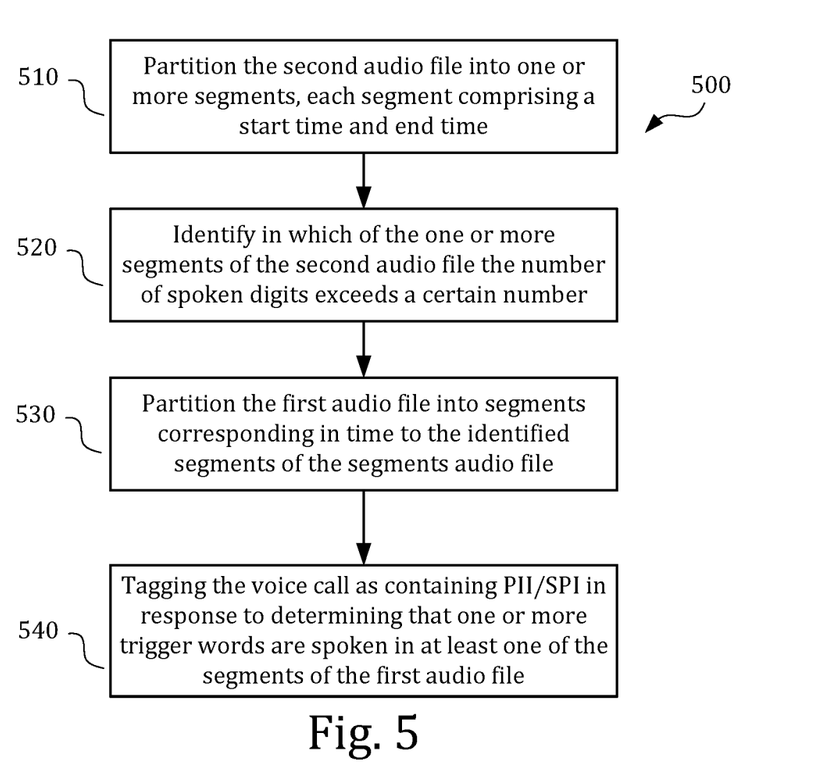
FIG. 5 is a flow diagram showing another example process for identifying PII or SPI in a voice call.

FIG. 5 is a flow diagram showing another example process 500 for identifying PII or SPI in a voice call. In some implementations, after the first and second audio files are processed according to FIG. 2B, the first and second audio files may be processed in the reverse order. For example, the second audio file is processed first to identify spoken digits and the first audio file is subsequently processed to detect corresponding trigger words, in the manner described in FIG. 2B. Operations of process 500 may be performed by one or more processors of a device, e.g. analysis node 240 of FIG. 2A-2B, coupled to a communications network 106. For example, operations in the example process 500 may be performed by the example analysis node 240 in FIG. 2, which may be included in an example server 102 or communications device 104 in FIG. 1 configured to analyze audio recording associated with a voice call to detect PII or SPI. The process 500 may include additional or different operations, and the operations may be performed in the order shown or in another order. In some cases, one or more of the operations shown in FIG. 5 are implemented as processes that include multiple operations, sub-processes or other types of routines. In some cases, operations can be combined, performed in another order, performed in parallel, iterated, or otherwise repeated or performed another manner.

At 510, the second audio file is partitioned into one or more segments. Each of the segments has a start time and an end time. A segment of the audio file may be identified by detecting a spoken digit at a timepoint in the second audio file. Based on the timepoint in which the spoken digit is detected, a start time is determined. The start time may be a number of seconds prior to the timepoint. In some cases, the stop time may be the same number of seconds after the timepoint. In other cases, the stop time may be determined by detecting subsequent spoken digits occurring within a certain amount of time between the subsequent digits. For example, the stop time may be set at the time that the certain amount of time between subsequent digits is exceeded, e.g. a next subsequent digit is not detected within the given amount of time after the previously detected digit. In some instances, the number of seconds may be twenty (20) seconds for determining the start time and the stop time.

At 520, which of the one of more of the segments of the second audio file that the number of spoken digits exceeds a certain number is identified. In some cases, the certain number of spoken digits exceeded is four (4). For example, segments of the second audio file that have more than 4 spoken digits are identified.

At 530, segments of the first audio file corresponding in time to the identified segments of the second audio file are partitioned. At 540, the voice call is tagged as containing PII or SPI in response to determining that one or more trigger words are spoken in at least one of the segments of the first audio file. Restrictions for accessing the tagged voice call may be the same or similar as to the restrictions described in FIG. 3. Further, portions of the first and second audio file associated with the tagged voice call may be deleted as described in FIG. 4.

Figure 6:
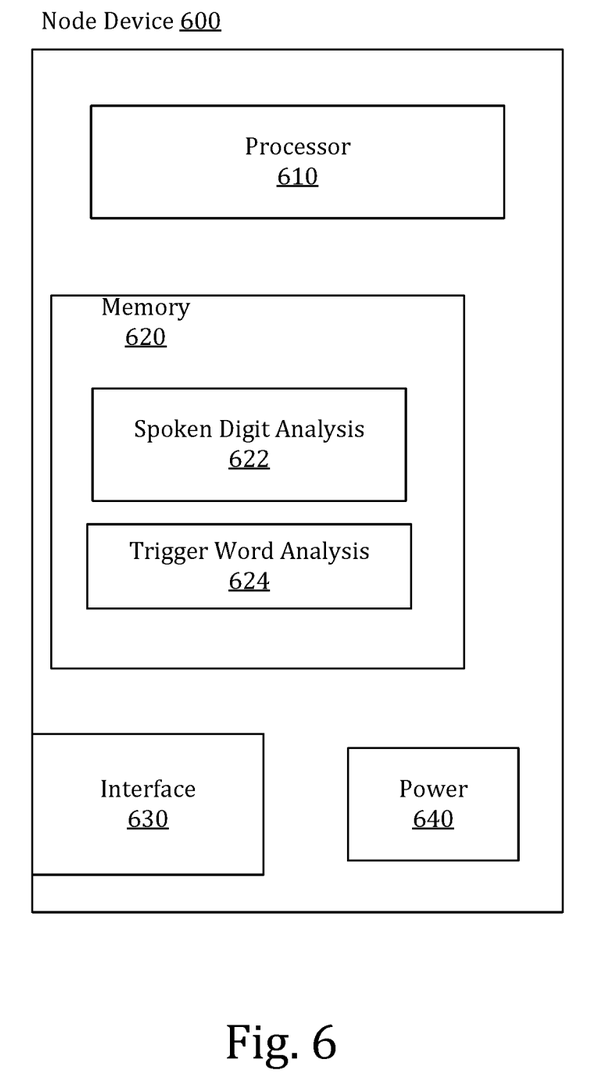
FIG. 6 illustrates a block diagram of an example node for processing audio file.

FIG. 6 is a block diagram showing an example node device 700. As shown in FIG. 6, the example node device 600 includes interface 630 for transmission and/or reception of data and/or signals, a processor 610, a memory 620, and a power unit 640. For example, a node device 600 may be, include or be included in any of the server devices 102 and communication devices 104 in the communication system 100 illustrated in FIG. 6. Each of these types of devices may include the same, additional or different components of node device 600, and the components may be configured to operate as analysis node 240 as shown in FIG. 2A-2B, or in another manner. In some implementations, the interface 630, processor 610, memory 620, and power unit 640 of a node device are housed together in a common housing or other assembly. In some implementations, one or more of the components of a node device can be housed separately, for example, in a separate housing or other assembly.

The example interface 630 can communicate (receive, transmit, or both) wireless signals or wired signals. For example, the interface 630 may be implemented as a wired or wireless interface, or may be implemented in another manner, for example, with other types of components or subsystems. For example, the interface 630 may be a network interface configured to communicate signals via physical ports over ethernet, fiber, cable, or other types of physical media. In another example, interface 630 may be configured to communicate radio frequency (RF) signals formatted according to a wireless communication standard (e.g., Wi-Fi or Bluetooth). In some cases, an interface 630 of node device 600, e.g., analysis node 240, may be configured to receive audio files 225, 230 as illustrated in FIG. 2A. In some instances, the interface 630 is configured to receive a notification 235 that a voice call has been recorded. In some instances, the interface 630 of the node device 600 may be configured to provide, or transmit, modified audio files with PII or SPI deleted to another node device of the communication network 106 for storage, e.g. telecommunication service 220 shown in FIG. 2A.

The example processor 610 can execute instructions, for example, to analyze audio files associated with a voice call to detect PII or SPI and tag audio files containing PII or SPI. The instructions can include programs, codes, scripts, modules, or other types of data stored in memory 620. Additionally or alternatively, the instructions can be encoded as pre-programmed or re-programmable logic circuits, logic gates, or other types of hardware or firmware components or modules. The processor 610 may be or include a general-purpose microprocessor, as a specialized co-processor or another type of data processing apparatus. In some cases, the processor 610 performs high level operation of the node device 600. For example, the processor 610 may be configured to execute or interpret software, scripts, programs, functions, executables, or other instructions stored in the memory 620. In some implementations, the processor 610 be included in the interface 630. In some cases, the processor 610 may execute instructions that cause the node device to perform the methods of FIGS. 3-5. For example, processor 610 may cause the node device to obtain first and second audio files associated with an a voice call, partitioning the first audio file into one or more segments, each segment comprising a start time and an end time, identifying in which of the one or more segments of the first audio file the number of spoken digits exceeds a certain number, partitioning the second audio file into segments corresponding in time to the identified segments of the first audio file in which the number of spoken digits exceeds the certain number, and tagging the voice call as containing PII or SPI in response to determining that one or more trigger words are spoken in at least one of the segments of the second audio file corresponding to the identifies one or more segments of the first audio file.

The example memory 620 may include computer-readable storage media, for example, a volatile memory device, a non-volatile memory device, or both. The memory 620 may include one or more read-only memory devices, random-access memory devices, buffer memory devices, or a combination of these and other types of memory devices. In some instances, one or more components of the memory can be integrated or otherwise associated with another component of the node device 700. The memory 720 may store instructions that are executable by the processor 710. For example, the instructions may include instructions for analyzing audio files for PII or SPI, as described in the example process 300 shown in FIG. 3, example process 400 shown in FIG. 4, and example process 500 shown in FIG. 5. In some instances, the memory 620 may include instructions to analyze an audio file for spoken digits 622, instructions to analyze an audio file for trigger words 624. In some cases, the memory 620 may include additional instructions, for example, instructions for training, executing, or otherwise operating or modifying a motion detection system. In some cases, the memory 620 may store a copy of the audio files being analyzed, intermediate files, e.g. segments, or resulting edited files in which PII or SPI has been removed, while executing instructions to perform any of the methods in FIGS. 3-5.

The example power unit 640 provides power to the other components of the node device 600. For example, the other components may operate based on electrical power provided by the power unit 640 through a voltage bus or other connection. In some implementations, the power unit 640 includes a battery or a battery system, for example, a rechargeable battery. In some implementations, the power unit 640 includes an adapter (e.g., an AC adapter) that receives an external power signal (from an external source) and coverts the external power signal to an internal power signal conditioned for a component of the node device 600. The power unit 640 may include other components or operate in another manner.

Some of the subject matter and operations described in this specification can be implemented in digital electronic circuitry, or in a combination of computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus, such as, module 622 for analyzing an audio file for spoken digits and module 724 for analyzing an audio for trigger words. A computer storage medium can be, or can be included in, a non-transitory computer readable medium, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, a stylus, or another type of pointing device) by which the user can provide input to the computer. The operations may be implemented as graphical user interface (GUI). For example, audio recordings associated with a voice call may be requested via a GUI, and if the voice call is tagged as having PII or SPI, the GUI will indicate that access to the voice call is restricted. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect, audio recordings are managed to protect personal identifiable information (PII) and/or sensitive personal information (SPI) in audio recordings.

In a first example, a first audio file associated with a first channel of a voice call and a second audio file associated with a second channel of the voice call are obtained. The first audio file is partitioned into one or more segments, each segment comprising a start time and an end time. Which of the one or more segments of the first audio file the number of spoken digits exceeds a certain number is identified. The second audio file is portioned into segments corresponding in time to the identified segments of the first audio file in which the number of spoken digits exceeds the certain number. The voice call is tagged as containing PII or SPI in response to determining that one or more trigger words are spoken in at least one of the segments of the second audio file corresponding to the identifies one or more segments of the first audio file.

In a second example, a computer-readable storage medium stores instructions that are operable when executed by one or more processors to perform one or more operations of the first example.

In a third example, a computer system includes one or more processors and a memory storing instructions that are operable when executed by the one or more processors to perform one or more operations of the first example.

Implementations of the first, second, and third examples may include one or more of the following features. Deleting one or more portions of the second audio corresponding in time to segments in which spoken trigger words are detected, and deleting one or more portions of the first audio file corresponding in time to the deleted portion of the second audio file. Restricting access to the first and second audio files associated with the tagged voice call. Obtaining the first and second audio files associated with the voice call in response receiving a notification that a voice call is available for analysis. Detecting a spoken digit in the first audio file at a timepoint, and determining the start time and stop time for the segment based on the timepoint. The start time is a number of seconds prior to the timepoint. The stop time is a time subsequent to the timepoint, and is determined by determining whether a subsequent spoken digit occurred within a certain amount of time of a previous spoken digit, and setting the stop time as a time that the certain amount of time between subsequent digits is exceeded. The number of seconds is twenty seconds. The certain number of identified digits exceeded in a segment is four. Rejecting requests to obtain the first or second audio file associated with the voice call, or limiting access to the edited first and second audio files. Partitioning the second audio file into a plurality of segments, each segment comprising a start time and an end time, identifying one or more segments of the second audio file in which the number of spoken digits exceeds a certain number, partitioning the first audio file into one or more segments corresponding in time to the one or more segments identified in the second audio file, and tagging the voice call as containing PII and/or SPI in response to determining that one or more trigger words are spoken in at least one of the one or more segments of the first audio file.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method to protect personal identifiable information (PII) or sensitive personal information (SPI) in audio recordings, comprising:
   obtaining a first audio file associated with a first channel of a voice call;
   obtaining a second audio file associated with a second channel of the voice call;
   partitioning, by one or more processors, the first audio file into one or more segments comprising spoken digits, each segment comprising a start time and an end time, by:
      detecting a spoken digit in the first audio file at a timepoint;
      determining whether a subsequent spoken digit occurred within a certain amount of time of a previous spoken digit; and
      setting the end time of the segment when the certain amount of time between subsequent digits is exceeded with no digits being detected;

identifying in which of the one or more segments of the first audio file the number of spoken digits exceeds a certain number;

partitioning, by the one or more processors, the second audio file into segments corresponding in time to the identified segments of the first audio file;

determining whether to tag the voice call as containing PII or SPI in response to determining whether one or more trigger words are spoken in at least one of the corresponding segments of the second audio file;

partitioning, by one or more processors, the second audio file into one or more segments comprising spoken digits, each segment comprising a start time and an end time, by:

detecting a spoken digit in the second audio file at a timepoint;

determining whether a subsequent spoken digit occurred within a certain amount of time of a previous spoken digit; and     setting the end time of the segment when the certain amount of time between subsequent digits is exceeded with no digits being detected;

identifying one or more segments of the second audio file in which the number of spoken digits exceeds a certain number;

partitioning the first audio file into one or more segments corresponding in time to the one or more identified segments in the second audio file;

determining whether to tag the voice call as containing PII or SPI in response to determining whether one or more trigger words are spoken in at least one of the one or more corresponding segments of the first audio file.

2. The method of claim 1, further comprising:
restricting access to the first and second audio files associated with the tagged voice call.

3. The method of claim 2, wherein restricting access to the first and second audio files associated with the tagged voice call comprises:
    rejecting requests to obtain the first or second audio file associated with the voice call from the server.

4. The method of claim 1, further comprising:
    deleting one or more portions of the second audio file corresponding in time to the at least one of the segments of the second audio file in which one or more trigger words are determined to be spoken and storing the second audio file as an edited second audio file; and
    deleting one or more portions of the first audio file corresponding in time to the deleted one or more portions of the second audio and storing the first audio file as an edited first audio file.

5. The method of claim 1, wherein the first and second audio files associated with the voice call are obtained in response to receiving a notification that a voice call is available for analysis.

6. The method of claim 1, wherein the start time is a number of seconds prior to the timepoint.

7. The method of claim 6, wherein the number of seconds is twenty seconds.

8. The method of claim 1, wherein the certain number of identified digits exceeded in a segment is four.

9. The node device of claim 1, wherein the start time is a number of seconds prior to the timepoint.

10. The node device of claim 9, wherein the number of seconds is twenty seconds.

11. A node device, for protecting personal identifiable information (PII) or sensitive personal information (SPI) in audio recordings, comprising one or more processors and memory storing instructions that when executed by the one or more processors cause the node device to:

obtain a first audio file associated with a first channel of a voice call;

obtain a second audio file associated with a second channel of the voice call;

partition the first audio file into one or more segments comprising spoken digits, each segment comprising a start time and an end time, by:

detecting a spoken digit in the first audio file at a timepoint; determining whether a subsequent spoken digit occurred within a certain amount of time of a previous spoken digit;

and setting the end time of the segment when the certain amount of time between subsequent digits is exceeded with no digits being detected;

identify in which of the one or more segments of the first audio file the number of spoken digits exceeds a certain number;

partition the second audio file into segments corresponding in time to the identified segments of the first audio file; tag the voice call as containing PII or SPI in response to determining that one or more trigger words are spoken in at least one of the corresponding segments of the second audio file;

partition the second audio file into one or more segments comprising spoken digits, each segment comprising a start time and an end time, by:

detecting a spoken digit in the second audio file at a timepoint; determining whether a subsequent spoken digit occurred within a certain amount of time of a previous spoken digit; and setting the end time of the segment when the certain amount of time between subsequent digits is exceeded with no digits being detected;

identify one or more segments of the second audio file in which the number of spoken digits exceeds a certain number; partition the first audio file into one or more segments corresponding in time to the one or more identified segments in the second audio file;

tag the voice call as containing PII or SPI in response to determining that one or more trigger words are spoken in at least one of the one or more corresponding segments of the first audio file.

12. The node device of claim 11, the memory comprising instructions that when executed by the one or more processors cause the node device to:
    restrict access to the first and second audio files associated with the tagged voice call.

13. The node device of claim 12, wherein restricting access to the first and second audio files associated with the tagged voice call comprises:
    rejecting requests to obtain the first or second audio file associated with the voice call.

14. The node device of claim 11, the memory comprising instructions that when executed by the one or more processors cause the node device to:
    delete one or more portions of the second audio file corresponding in time to the at least one of the segments of the second audio file in which one or more trigger words are determined to be spoken and storing the second audio file as an edited second audio file; and
    delete one or more portions of the first audio file corresponding in time to the deleted one or more portions of the second audio and storing the first audio file as an edited first audio file.

15. The node device of claim 11, wherein the first and second audio files associated with the voice call are obtained in response to receiving a notification that a voice call is available for analysis.

16. The node device of claim 11, wherein the certain number of identified digits exceeded in a segment is four.

17. A non-transitory computer-readable medium for protecting personal identifiable information (PII) or sensitive personal information (SPI) in audio recordings,
comprising instructions that when executed by one or more processors of a node device are operable to cause the node device to:
obtain a first audio file associated with a first channel of a voice call; obtain a second audio file associated with a second channel of the voice call;
partition the first audio file into one or more segments comprising spoken digits, each segment comprising a start time and an end time, by:
detecting a spoken digit in the first audio file at a timepoint;
determining whether a subsequent spoken digit occurred within a certain amount of time of a previous spoken digit;
and setting the end time of the segment when the certain amount of time between subsequent digits is exceeded with no digits being detected;
identify in which of the one or more segments of the first audio file the number of spoken digits exceeds a certain number;
partition the second audio file into segments corresponding in time to the identified segments of the first audio file;
and tag the voice call as containing PII or SPI in response to determining that one or more trigger words are spoken in at least one of the corresponding segments of the second audio file;
partition the second audio file into one or more segments comprising spoken digits, each segment comprising a start time and an end time, by:
detecting a spoken digit in the second audio file at a timepoint; determining whether a subsequent spoken digit occurred within a certain amount of time of a previous spoken digit;
and setting the end time of the segment when the certain amount of time between subsequent digits is exceeded with no digits being detected;
identify one or more segments of the second audio file in which the number of spoken digits exceeds a certain number;
partition the first audio file into one or more segments corresponding in time to the one or more identified segments in the second audio file; tag the voice call as containing PII or SPI in response to determining that one or more trigger words are spoken in at least one of the one or more corresponding segments of the first audio file.

18. The non-transitory computer readable medium of claim 17, further comprising instructions to:
restrict access to the first and second audio files associated with the tagged voice call.

19. The non-transitory computer readable medium of claim 18, wherein restricting access to the first and second audio files associated with the tagged voice call comprises:
rejecting requests to obtain the first or second audio file associated with the voice call.

20. The non-transitory computer readable medium of claim 17, further comprising instructions to:
delete one or more portions of the second audio file corresponding in time to the at least one of the segments of the second audio file in which one or more trigger words are determined to be spoken and storing the second audio file as an edited second audio file; and
delete one or more portions of the first audio file corresponding in time to the deleted one or more portions of the second audio and storing the first audio file as an edited first audio file.

21. The non-transitory computer readable medium of claim 17,
wherein the first and second audio files associated with the voice call are obtained in response to receiving a notification that a voice call is available for analysis.

22. The non-transitory computer readable medium of claim 17, wherein the start time is a number of seconds prior to the timepoint.

23. The non-transitory computer readable medium of claim 22, wherein the number of seconds is twenty seconds.

* * * * *

UNITED STATES PATENT AND TRADEMARK OFFICE
CERTIFICATE OF CORRECTION

PATENT NO. : 10,468,026 B1
APPLICATION NO. : 16/104702
DATED : November 5, 2019
INVENTOR(S) : Zachary Ward Newman et al.

It is certified that error appears in the above-identified patent and that said Letters Patent is hereby corrected as shown below:

In the Specification

In Column 2, Line 20, delete "SII" and insert -- SPI -- therefor.

In Column 6, Line 32, delete "FIG." and insert -- FIGS. -- therefor.

In Column 8, Line 17, delete "FIG." and insert -- FIGS. -- therefor.

In Column 8, Line 65, delete "700." and insert -- 600. -- therefor.

In Column 9, Line 7, delete "FIG." and insert -- FIGS. -- therefor.

In Column 10, Line 9, delete "700." and insert -- 600. -- therefor.

In Column 10, Line 9, delete "720" and insert -- 620 -- therefor.

In Column 10, Line 10, delete "710." and insert -- 610. -- therefor.

In Column 10, Line 50, delete "724" and insert -- 624 -- therefor.

In the Claims

In Column 14, Lines 10-11, Claim 11, after "timepoint;" insert -- ¶ --.

In Column 14, Line 13, Claim 11, after "digit;" insert -- and --.

In Column 14, Line 14, Claim 11, before "setting" delete "and".

In Column 14, Line 23, Claim 11, after "file;" insert -- ¶ --.

Signed and Sealed this
Third Day of March, 2020

Andrei Iancu
*Director of the United States Patent and Trademark Office*

CERTIFICATE OF CORRECTION (continued)
U.S. Pat. No. 10,468,026 B1

In Column 14, Line 31, Claim 11, after "timepoint;" insert -- ¶ --.

In Column 14, Line 33, Claim 11, after "and" insert -- ¶ --.

In Column 14, Line 39, Claim 11, after "number;" insert -- ¶ --.

In Column 15, Line 9, Claim 17, after "recordings," delete "¶".

In Column 15, Line 14, Claim 17, after "call;" insert -- ¶ --.

In Column 15, Line 23, Claim 17, after "digit;" insert -- and --.

In Column 15, Line 24, Claim 17, before "setting" delete "and".

In Column 15, Line 32, Claim 17, after "file;" insert -- and --.

In Column 15, Line 33, Claim 17, before "tag" delete "and".

In Column 15, Line 41, Claim 17, after "timepoint;" insert -- ¶ --.

In Column 15, Line 43, Claim 17, after "digit;" insert -- and --.

In Column 16, Line 1, Claim 17, before "setting" delete "and".

In Column 16, Line 9, Claim 17, after "file;" insert -- ¶ --.

In Column 16, Line 35, Claim 21, after "claim 17," delete "¶".